US005748752A

United States Patent [19]

Reames

[11] Patent Number: 5,748,752

[45] Date of Patent: May 5, 1998

[54] ADAPTIVE VOICE ENHANCING SYSTEM

[76] Inventor: James B. Reames, 6215 Old Keene Mill Ct., Springfield, Va. 22152-2324

[21] Appl. No.: 749,733

[22] Filed: Nov. 15, 1996

Related U.S. Application Data

[63] Continuation of Ser. No. 362,882, Dec. 23, 1994, abandoned.

[51] Int. Cl.[6] .......... H04B 15/00

[52] U.S. Cl. .......... 381/94.1; 381/66; 381/72; 381/94.2; 381/94.7

[58] Field of Search .......... 381/71–72, 94, 381/66; 455/200.1; 379/388, 390, 410–412

[56] References Cited

U.S. PATENT DOCUMENTS

| | | | |
|---|---|---|---|
| 4,177,430 | 12/1979 | Paul | 455/200.1 |
| 4,238,746 | 12/1980 | McCool et al. . | |
| 4,589,137 | 5/1986 | Miller . | |
| 4,903,247 | 2/1990 | Ver Gerwen et al. . | |
| 5,117,401 | 5/1992 | Feintuch . | |
| 5,226,016 | 7/1993 | Christman . | |
| 5,381,473 | 1/1995 | Andrea et al. | 381/71 |
| 5,402,496 | 3/1995 | Soli et al. | 381/94 |

FOREIGN PATENT DOCUMENTS

| | | | |
|---|---|---|---|
| 0269083 | 9/1994 | Japan | 381/94 |

OTHER PUBLICATIONS

Widrow, "Adaptive Noise Cancelling: Principles and Applications" Proceedings of IEEE, V. 63, No. 12, pp. 1692–1719, Dec. 1975.

Widrow, "Adaptive Filters", Aspects of Network and System Theory, Kalman et al., eds., Holt, Rhinehart & Winston, Inc., 1971, pp. 563–587.

*Primary Examiner*—Curtis Kuntz
*Assistant Examiner*—Duc Nguyen
*Attorney, Agent, or Firm*—Lane, Aitken, McCann

[57] ABSTRACT

A transducer/transmitter captures not only the acoustic signal in the voice band, as in the prior art, but also an acoustic signal that includes audio signals outside the voice band; preferably above the voice band, up to approximately 20k Hertz. A band pass filter separates the transducer signal into two components; a voice signal with overlapping noise in the range of the human voice (e.g. from about 40 Hertz to 8k Hertz) and a component that provides a no voice signal, for example a signal in a no voice band extending from above approximately 8k Hertz to about 20k Hertz.

2 Claims, 3 Drawing Sheets

ADAPTIVE VOICE ENHANCING SYSTEM

This application is a continuation of application Ser. No. 08/362,882, filed Dec. 23, 1994, now abandoned.

BACKGROUND OF THE INVENTION

1. Field of the Invention

This invention relates to an improved method and apparatus for enhancing voice components in a transducer output signal relative to overlapping noise components generated by extraneous audible inputs to the transducer, and more particularly to an improved adaptive filter system in which the primary and reference inputs are generated by a common acoustic transducer system.

2. Description of the Prior Art

In the prior art, adaptive signal processing technology is well known for enhancing a desired signal relative to an overlapping undesired signal (i.e. a noise signal). These adaptive signal processing procedures include the technology developed by Widrow: see "Adaptive Noise Cancelling: Principles and Applications," by Widrow et al., Proceedings of the IEEE, Volume 63, No. 12, pp. 1692–1719, December 1975, incorporated herein by reference. Such circuitry requires a sensor which measures both desired signal and noise signal and is referred to as the primary sensor. A secondary input, referred to as the reference, requires a sensor that measures noise only and must be "desired signal free". This reference input is filtered adaptively by using a Least Mean Square (LMS) algorithm which attempts to produce an output that is a replica of the noise on the primary input. The subtraction of the filtered reference replica from the primary input then provides the cancellation of noise. A "desired signal free" reference is thus a requirement for an effective adaptive noise cancellation system. If a portion of the desired signal is present on the reference channel, the desired signal as well as noise may be canceled adaptively. This would reduce the effectiveness of the adaptive noise cancellation system as well as any other systems that are required for post-processing of signals.

In certain situations, such as law enforcement surveillance, it is desirable to listen to and/or record what an individual or individuals are saying without the individual being aware that his voice is being overheard and/or recorded. Commonly, in these situations, a small voice to electric signal transducer (i.e. a microphone) is placed in a location where it will not be seen, but in a location close enough to the range of locations where the individual is expected to be so that it can pick up sound waves generated by the individual's voice. The transducer may be connected to a small transmitter which transmits the transducer signal to a remote location where the voice is monitored and/or recorded or may be recorded at the transducer. Typically, in the prior art, the transmitted (or recorded) signal bandwidth is limited to the bandwidth of the human voice, i.e. from about 40 Hertz to about 8,000 Hertz, or a subset of the human voice bandwidth required to relay voice intelligibly (e.g. 250 Hertz to 3,000 Hertz). A receiver at the remote location receives the transmitted signal and generates an audio signal to allow an operator to listen to the individual's voice and/or to record the transmitted signal on a suitable recording medium, such as a magnetic tape.

In situations such as these, there are often audible extraneous sound generators (e.g. radio and TV broadcasts, motors, automobiles, etc.) in sufficiently close proximity to the transducer to produce an audible component in the transducer output that overlays, at least in part, the frequency range of the human voice. Since it is not always possible to know or dictate the location of the individual or individuals of interest relative to the transducer or the relative amplitude of the background sound relative to the amplitude of the voice, often the voice component of the transducer output becomes unintelligible due to the background audio signal, which overlaps the voice component. This extraneous background audio signal is sometimes referred to as a noise signal. Here it should be noted that the background audio signal is a noise signal in the sense that it is unwanted, but is typically not a noise signal in the sense that the signal is random.

As pointed out above, there are well known and commercially available adaptive filtering technologies in the prior art for filtering unwanted signal components (e.g. noise components) from a desired signal component. U.S. Pat. No. 4,238,746 ('746) entitled "Adaptive Line Enhancer" which is incorporated herein by reference is an example of such technology for spectral line enhancing. This '746 patent describes an adaptive spectral line enhancer that automatically filters the components of the signal which are uncorrelated in time and passes the correlated portions. The properties of the device are determined solely by the input signal statistics, the properties of the filter automatically adjust to variations in the input signal statistics to obtain the least mean square (LMS) approximation to a Wiener-Hopf filter. Such adaptive least mean square (LMS) linear transversal filters are described by B. Widrow, "Adaptive Filters," in *Aspects of Network and System Theory,* R. E. Kalman and N. Declaris, eds., Holt, Rhinehart & Winston, Inc., New York, 1971; and by the same author in the Stanford Electronics Laboratory Technical Report No. 6764-6, Stanford University, 1966, which articles are also incorporated herein by reference. The '746 device approximates a set of matched filters in which the filter pass bands are determined automatically, solely on the basis of the input signal statistics. No predetermined information as to the number of signals, their frequencies, or the dynamics of their source is required. Since it is an adaptive filter, it automatically adjusts the pass band of the filter to follow changes in the input signal's statistics. The frequency limitations of the device are determined by the input sampling rate, the number of weights, and the weight update rate. Other examples of the use of adaptive filters for noise cancellation may be found in U.S. Pat. Nos. 4,589,137; 4,903,247; 5,117,401 and 5,226,016.

The technology described in the '746 patent and the IEEE article by Widrow entitled "Adaptive Noise Cancelling: Principles and Applications" has been used in the prior art to enhance the voice component of a signal with an overlapping noise component. However, these prior art systems use a desired signal free reference (e.g. a no voice signal) derived from a source other than the acoustic transducer that generated the voice signal; for example, a transducer proximate the noise source and remote from the voice source. However, in some cases, such as in the above surveillance example, it has not been possible or practical to obtain a voice free sample of the overlapping noise for use as an adaptive filter reference signal.

SUMMARY OF THE INVENTION

An object of this invention is the provision of an improved method and system for enhancing voice signal components in a signal generated by an acoustic transducer that includes components from extraneous audio sources. A method and system that uses an adaptive filter where circumstances make it impractical to obtain a voice free sample of the overlapping noise signal using prior art techniques.

Briefly this invention contemplates the provision of a transducer/transmitter that captures not only the acoustic signal in the voice band, as in the prior art, but also a signal that includes audio signals outside the voice band; preferably above the voice band; i.e. between 8k Hertz and approximately 20k Hertz. A band pass filter separates the transducer signal into two components; a voice signal with overlapping noise in the range of the human voice (e.g. from about 40 Hertz to 8k Hertz) and a component that provides noise only, no voice signal, for example a signal extending from above approximately 8k Hertz to about 20k Hertz.

The signal component in the no voice band is used as an input to an adaptive filter to generate a replica, in phase and amplitude, of the noise component of the signal in the voice band. This noise replica is subtracted from the voice band signal to cancel the overlapping noise components in this voice band.

BRIEF DESCRIPTION OF THE DRAWINGS

The foregoing and other objects, aspects and advantages will be better understood from the following detailed description of the preferred embodiment of the invention with reference to the drawings, in which.

DETAILED DESCRIPTION OF A PREFERRED EMBODIMENT OF THE INVENTION

Figure 1:
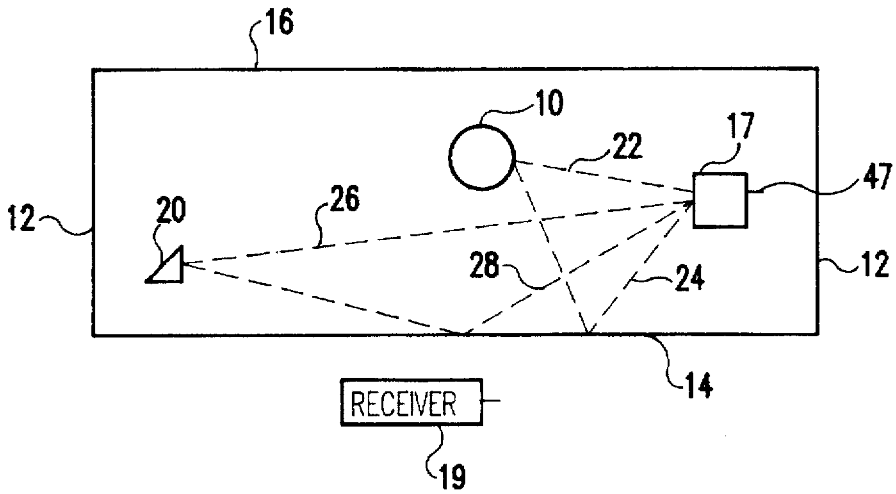
FIG. 1 is a simplified pictorial drawing representing a room with an individual and an extraneous audio source, illustrating direct and reflected paths for the speaker and the audio source.

Referring now to FIG. 1, while it will be appreciated by those skilled in the art that the invention is not limited thereto, in a typical situation to which the teachings of the invention are applicable, someone desires to listen to and/or record the sounds of the voice of an individual 10, located in an acoustic enclosure (i.e. a room or hall) indicated here schematically by side walls 12, floor 14 and ceiling 16. A transducer/transmitter 17 (or transducer/recorder) is located in the room at a position remote from the individual 10. There is a source 20 of extraneous sound, such as a radio or TV in the room, or source 20 may represent a sound generated outside the room, entering through a door or window, for example. It will be appreciated that this drawing has been greatly simplified for the purpose of illustrating principles of the invention. Typically there would be more than one individual speaker of interest and more than one source of extraneous audible sound, but the principle is the same.

Figure 2:
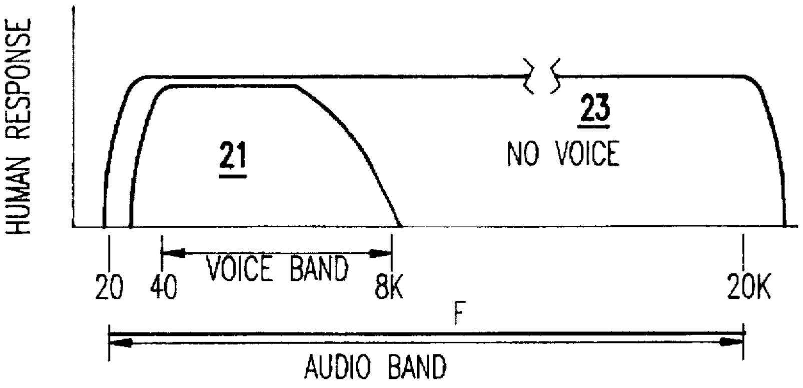
FIG. 2 is an illustrative diagram, in the frequency domain, of the voice band and audio frequency band.

Referring now to FIG. 2 as well as FIG. 1, as will be appreciated by those skilled in the art, the frequency band 21 of the human voice extends from approximately 40 Hertz to about 8k Hertz. The frequency band 23 which a human can hear (i.e. the audio band) extends from about 20 Hertz to about 20k Hertz. A typical extraneous audio source, such as a radio for example, has an output signal in a frequency band which overlaps some or all of the voice band 21, and usually extends into the audio band above the voice band, which is referred to in this specification as the no voice band (i.e. a band that extends from approximately 8k Hertz to 20k Hertz). Of course, the no voice band is not necessarily limited to the band above (i.e. above 8k Hertz) the voice band. A no voice band exists below about 40 Hertz. However, use of all or part of the band above the voice band will generally be the most advantageous no voice band to use in the practice of the invention.

Figure 3A:
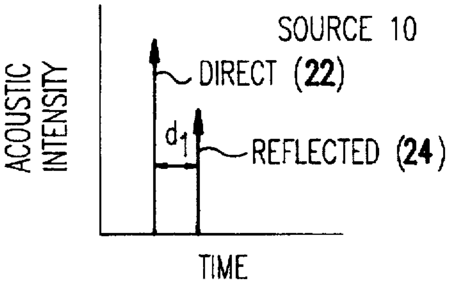
FIG. 3 is a simplified diagram, in the time domain, pictorially representing direct and reflected versions of a sound emanating from an individual (FIG. 3*a*) and an extraneous audio source (FIG. 3*b*).
Figure 3B:
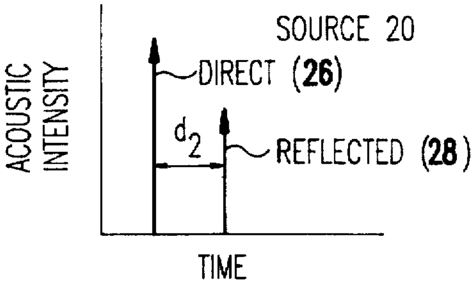

The sound wave generated by the voice of the individual 10 will travel to the transducer/transmitter 17 over a direct path 22 and multiple reflected paths, only one of which is shown here; path 24 reflected from the floor 14. Similarly, the extraneous audio source 20 generates a sound wave that travels to the transducer 17 over a direct path 26 and multiple reflected paths including a path 28 reflected from the floor 14. The ratio of direct and reflected path lengths (e.g. 22 and 24) for a sound generated by the voice of the individual 10 will, as a practical matter, always be different than the ratio of the direct and reflected path lengths (e.g. 26 and 28) of the extraneous audio source 20. As illustrated in FIG. 3, looking at the direct and reflected signals in the time domain, the difference in path length results in a delay $d_1$ between the direct and reflected sound waves from the individual's voice (FIG. 3*a*) that is different from the delay $d_2$ between the direct and reflected sound waves from source 20 (FIG. 3*b*). The reflected path length and resulting delay is, as a practical matter, independent of the frequency of the signal emanating from a source, either voice source 10 or extraneous audio source 20. The direct and reflected path length of the sound from source 20 will be the same in the voice and no voice regions. Therefore, the temporal pattern of the extraneous sound source is the same in the voice region and no voice region created by the different delays among direct and reflected sound. This temporal pattern permits the extraneous sound source to be adaptively filtered from the overlapping voice using the no voice signal as a reference signal to the adaptive filter.

FIGS. 1, 2 and 3 have been greatly simplified for ease of illustration; it will be appreciated that there will be a pattern generated by reflected versions of sound that is unique to each spatially separated sound source and a unique composite pattern as a result of multiple sound sources. The adaptive filter uses as a reference the extraneous audio signal in a frequency band where there is a no voice signal. Preferably, this no voice signal is a signal in a frequency band extending from above the highest voice frequency to at or near the highest humanly audible frequency, i.e. a range from above 8k Hertz to about 20k Hertz. Here, it should be noted again, that a range below about 40 Hertz contains a no voice audio signal that could be used, or only part of the no voice range 23 could be used.

Figure 4:
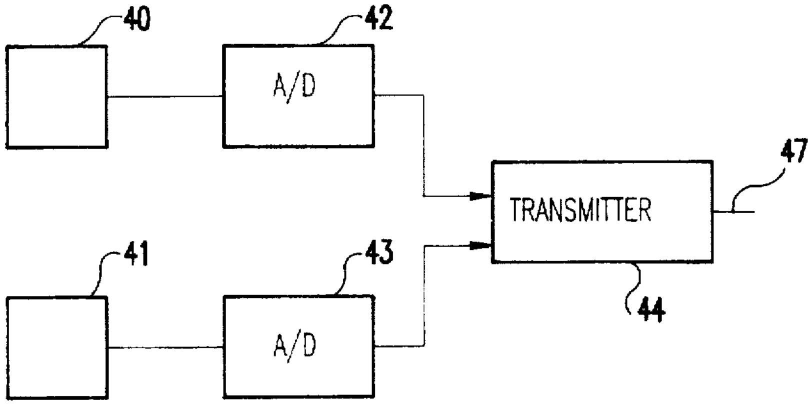
FIG. 4 is a block diagram of an embodiment of a transmitter in accordance with the teachings of this invention.

Referring now to FIG. 4, it shows a block diagram of a transducer/transmitter in accordance with the teaching of this invention. The transducer/transmitter can be any suitable device for recording or transmitting a wide band signal. That is, the transducer converts an acoustic signal comprised of both desired signal (voice) and noise (extraneous audio) components with respect to which the transducer does not provide discrimination. Transmission may be hard wired or wireless. In a preferred embodiment of the invention, the transducer/transmitter is a wireless transmitter transmitting digital signals approximately spanning the entire audio range from about 40 Hertz to about 20k Hertz. The transducer/transmitter includes two microphones 40 and 41 in order to provide a stereophonic signal. Here it should be noted that although multiple microphones are used, they do not provide any discrimination between desired signal (voice) and the extraneous audio signal. The microphones are connected respectively to analog to digital convertors 42 and 43 and the output of the convertors are coupled to a transmitter 44 of a suitable design known in the art. In a specific embodiment, the digital signals are multiplexed on a single high frequency carrier which is broadcast by an antenna 47. An analog signal could, if desired, be transmitted and a suitable cable could in some applications be used to transmit the signal.

Figure 5:
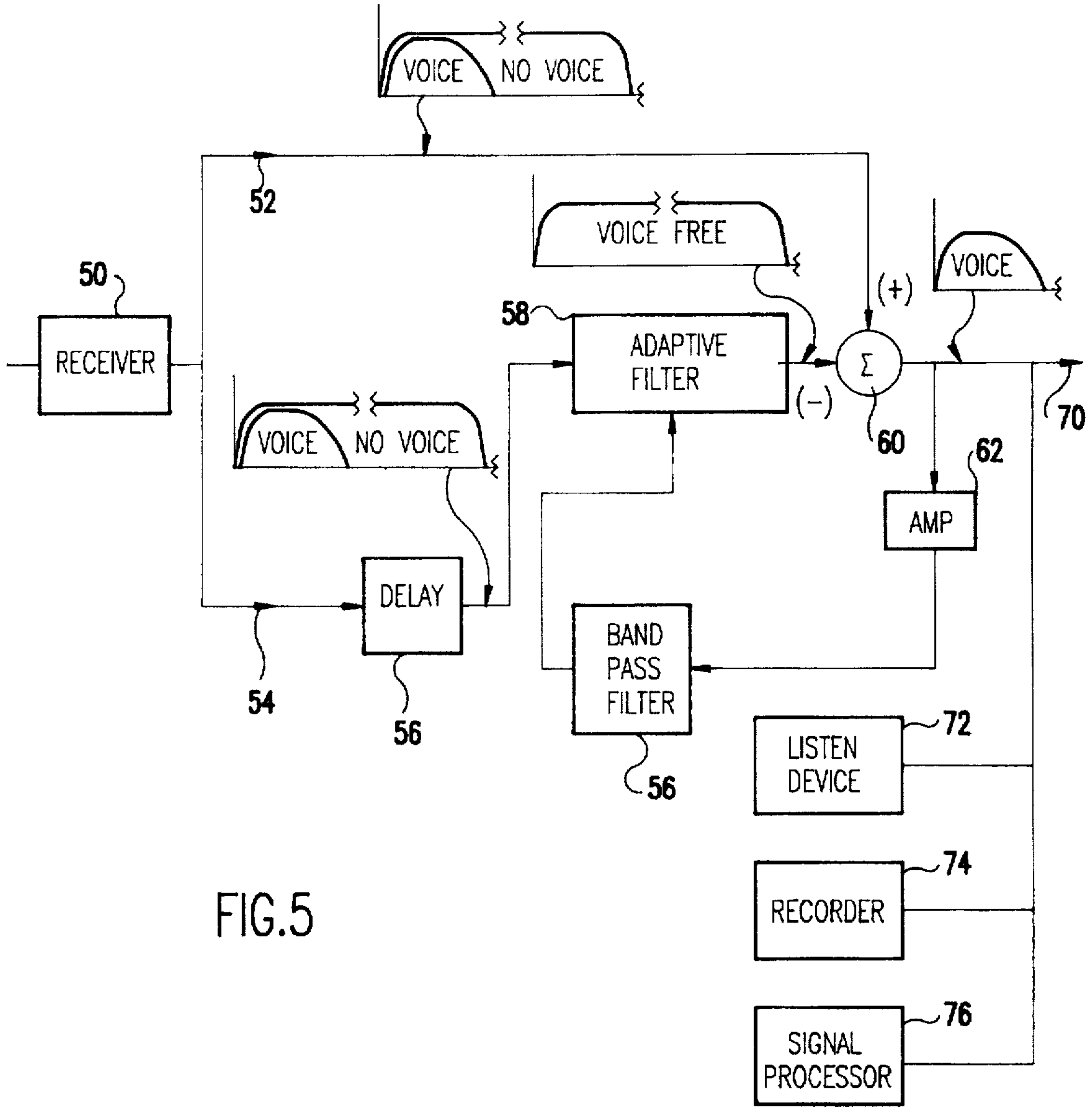
FIG. 5 is a block diagram of an embodiment of an adaptive voice enhancing system in accordance with the teaching of this invention.

Referring now to FIG. 5, the audio signal, comprised of the voice band components and no voice components, is coupled as an input to both a primary terminal 52 and a reference terminal 54 of an adaptive voice enhancer, which in a preferred embodiment is a digital voice enhancing system. In this embodiment, the inputs to terminals 52 and 54 are coupled from the output of a receiver demodulator 50, which receives, on antenna 51, the signal broadcast by antenna 47. Obviously, the inputs to terminals 52 and 54 could be from a hardwired input or from a recording made in the room.

The input to reference terminal 54 is coupled through a delay 56 to an input of an adaptive filter element 58 of a suitable design known in the art. As will be appreciated by those skilled in the art, the delay 56 provides system stability; the inserted delay is typically on the order of one or two sample periods. The signal input to primary terminal 52 is coupled to a summing junction 60, whose other input is an output of the filter element 58. The output of the summing junction 60 is fed back as an error signal via an amplifier 62 and a band pass filter 64 to the adaptive filter element 58 to adjust the weights of the filter element. The pass band of the band pass filter 64 is set to separate its input signal into a voice component in the voice band (e.g. 40 to 8k Hertz) and a no voice component in a band outside the voice band (e.g. 8k to 20k Hertz). The no voice component is coupled to adaptive filter element 58 as the feedback signal. Because the direct and reflected versions of the no voice reference contain only noise, it correlates with the noise component that overlaps the voice component but does not correlate with the voice component. The no voice reference adaptively adjusts the response of the filter element 58, in phase and amplitude, so that the filter element 58 in effect passes the extraneous audio signal component of the primary input at terminal 52 but does not pass the voice component. The output of the filter 58 matches, in phase and amplitude, the extraneous audio signal, and is coupled as an input to summing junction 60. The extraneous noise component is subtracted from the primary input to terminal 52, resulting in a voice signal output from the summing junction at 70 free, or relatively free, of overlapping extraneous audio components.

As pointed out previously, the direct and reflected paths of the extraneous audio (i.e. noise) signal produce a temporally coherent signal. In operation, the feedback error signal from the summing junction 60 via filter 64 adjusts the amplitude and phase of the adaptive filter output signal to match the amplitude and phase of the extraneous audio input signal on terminal 52. When the filter is so adjusted (within a few sample times), the feedback output of filter 64 is a minimum value or zero. The voice component of the input to the filter 58 from reference terminal 54 does not result in a corresponding component in the output of the filter 58 since there is no coherence between this voice component and the no voice feedback signal to adaptive filter 58 from the band pass filter 64.

Here it should be noted that, in practice, the reflected paths of the extraneous audio signal and the voice signal will change at least to some extent each time a person in the acoustic enclosure changes his or her position. Similarly, sources of extraneous audio signals may change from time to time, changing the extraneous audio signal component. Each time there is a change there will be an error signal feedback to the filter element 58 from the output of filter 64 to adjust the output of filter 58 so that it matches and therefore cancels the new extraneous audio signal.

The enhanced voice signal, free (or relatively free) of the overlying extraneous noise components, is coupled to a terminal 70. A listening device 72 or a recording device 74 or both, as well as further signal processing apparatus 76, may be coupled to the terminal 70.

Figure 6:
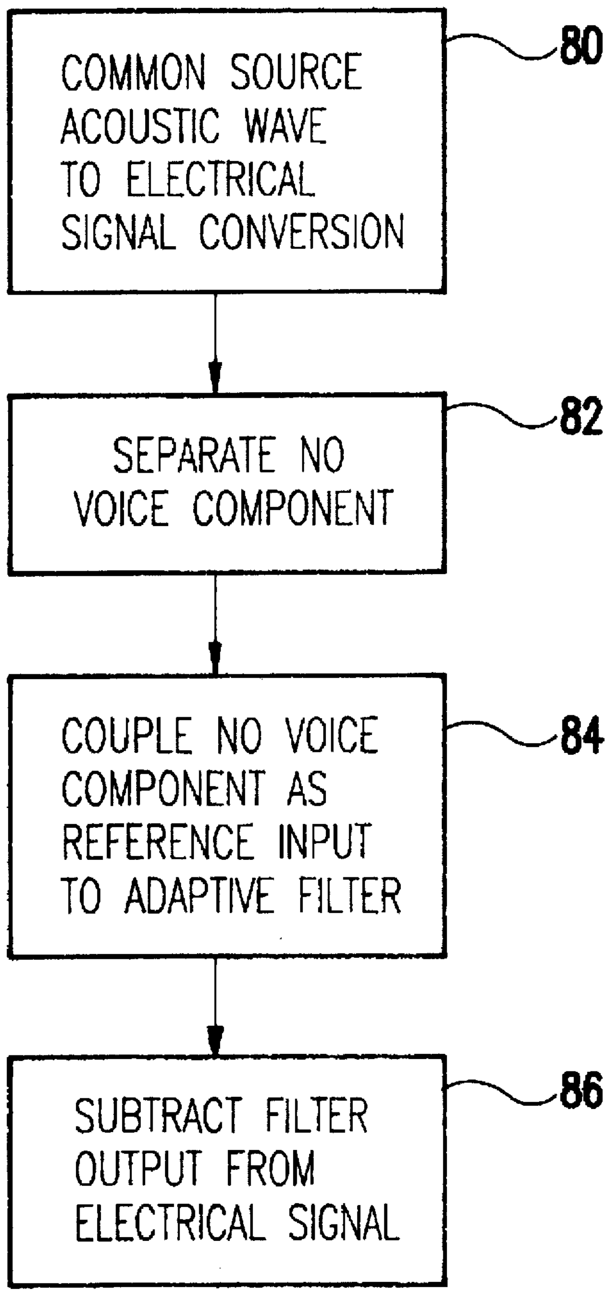
FIG. 6 is a flow diagram illustrating steps in enhancing the voice component of signal in the presence of an extraneous audio signal source in accordance with the teachings of this invention.

FIG. 6 is a flow diagram of the steps, in accordance with the invention, to enhance the voice component of a single source acoustic signal with an overlapping extraneous audio component. In the first step, block 80, a transducer generates a composite electrical signal with components of the audio signal both in the voice band and a no voice band. Next, in block 82, the no voice signal is separated from the composite signal. The separated no voice signal is coupled as a reference to an adaptive filter to generate a signal that replicates in amplitude and phase the extraneous audio signal, block 84. Finally, block 86, the signal that replicates the extraneous audio signal is subtracted from the voice band signal with the overlapping extraneous audio signal in order to remove or at least diminish the extraneous audio signal from the desired voice signal.

Having thus described my invention, what I claim as new and desire to secure by Letters Patent is as follows. In these claims, for ease of expression, the term noise is used to mean an extraneous audio source.

What is claimed is:

1. A system for listening to and/or recording at a site remote from a microphone the voice of a person speaking in a space which produces direct and reflected versions of an acoustic voice signal generated by said person and direct and reflected versions of acoustic audio signals generated by extraneous audio sources whose acoustic audio signal overlaps, at least in part, said acoustic voice signal, comprising in combination:

means for converting, including microphone means, a composite acoustic signal generated by a combination of direct and reflected versions of said acoustic voice signal, and direct and reflected versions of said acoustic audio signals to an electrical signal which includes a voice band component and a voice free component;

means for transmitting from said space to said site said electrical signal;

means, including filter means with a pass band outside the frequency band of the voice band component, for separating from the transmitted electrical signal a voice free signal;

an adaptive filter trained with said voice free signal on the basis of the temporal correlation among direct and reflected versions of said voice free signal extending in the band of said voice band component so that said adaptive filter passes from said electrical signal coupled as an input to said adaptive filter said acoustic audio signal and rejects the acoustic voice signal;

means for coupling as an input to said adaptive filter the transmitted electrical signal to generate as an output of said adaptive filter a version of said electrical signal free of said acoustic voice signal; and means for subtracting from the transmitted electrical signal said version of said electrical signal free of said acoustic voice signal.

2. A system for listening to and/or recording at a site remote from a microphone the voice of a person speaking in a space which produces direct and reflected versions of an acoustic voice signal generated by said person and direct and reflected versions of acoustic audio signals generated by extraneous audio sources whose acoustic audio signal overlaps, at least in part, said acoustic voice signal, comprising in combination:

means for converting, including microphone means, a composite acoustic signal generated by a combination of direct and reflected versions of said acoustic voice signal, and direct and reflected versions of said acoustic audio signals to a broadband electrical signal which includes a frequency band in the voice band and a frequency band above said voice band;

means for transmitting from said space to said site said electrical signal;

means, including filter means with a pass band above the frequency band of the voice band, for separating from the transmitted electrical signal a voice free signal in a frequency band above said voice band;

an adaptive filter trained with said voice free signal on the basis of the temporal correlation among direct and reflected versions of said voice free signal extending in the band of said voice band component so that said adaptive filter passes from said broadband electrical signal coupled as an input to said adaptive filter said acoustic audio signal and rejects the acoustic voice signal;

means for coupling as an input to said adaptive filter the transmitted broadband electrical signal to generate as an output of said adaptive filter a version of said broadband electrical signal free of said acoustic voice signal; and means for subtracting from the transmitted broadband electrical signal said version of said electrical signal free of said acoustic voice signal.

* * * * *